United States Patent [19]

Minker et al.

[11] Patent Number: 4,649,394
[45] Date of Patent: Mar. 10, 1987

[54] METHOD OF AND A DEVICE FOR RECOGNIZING TARGETS AND SUPPRESSING SPURIOUS SIGNALS IN RADAR EQUIPMENT

[75] Inventors: Manfred Minker; Hermann Rohling, both of Ulm/Donau, Fed. Rep. of Germany

[73] Assignee: Licentia Patent-Verwaltungs-GmbH, Frankfurt am Main, Fed. Rep. of Germany

[21] Appl. No.: 483,722

[22] Filed: Apr. 11, 1983

[30] Foreign Application Priority Data

Apr. 10, 1982 [DE] Fed. Rep. of Germany ....... 3213430
Jun. 24, 1982 [DE] Fed. Rep. of Germany ....... 3223565
Jun. 24, 1982 [DE] Fed. Rep. of Germany ....... 3223566

[51] Int. Cl.$^4$ ............................................. G01S 7/28
[52] U.S. Cl. ..................................... 342/94; 342/93
[58] Field of Search .................. 343/5 CF, 7 A, 5 DP, 343/5 CE

[56] References Cited

U.S. PATENT DOCUMENTS

| | | | |
|---|---|---|---|
| 3,701,149 | 10/1972 | Patton et al. ...................... | 343/5 DP |
| 3,729,737 | 4/1973 | Asam ................................. | 343/5 CF |
| 3,778,822 | 12/1973 | Bauer ................................. | 343/7 A |
| 3,829,858 | 8/1974 | Bergkvist ......................... | 343/5 CF |
| 4,012,627 | 3/1977 | Antoniak ......................... | 343/5 DP |
| 4,013,998 | 3/1977 | Bucciarelli et al. .............. | 340/146.2 |
| 4,104,633 | 9/1978 | Donahue et al. .................. | 343/7 A |
| 4,249,177 | 2/1981 | Chen ................................. | 343/7 A |
| 4,386,353 | 5/1983 | Bleijerveld et al. .............. | 343/5 CF |

FOREIGN PATENT DOCUMENTS

1509464 5/1976 United Kingdom .
1583829 2/1981 United Kingdom .
2072451 9/1981 United Kingdom .

OTHER PUBLICATIONS

*Introduction to Radar Systems*, by M. Skolnik, Second Edition; pp. 392-398.
"The Marconi Review", Fall 1977; "Radar Strike Extraction in Clutter Using 2-D Spatial Integration Techniques", by G. R. Martin; p. 210.
H. Rohling, "Radar CFAR Thresholding in Clutter and Multiple Target Situations"; (IEEE Trans. on Aerospace and Electronic Systems; vol. AES-19, No. 4, 7/83; pp. 608-621).
V. Hansen, "Constant False Alarm Rate Proc. in Search Radars", IEEE Conf. on Radar (10/23-25/73); IEEE Conf. Pub. No. 205, pp. 325-332.
G. Trunk, "Detection of Targets in Non-Gaussian Sea Clutter", IEEE Trans. on Aerospace and Elect. Systems, vol. AES-6, No. 5, pp. 620-627.
"Constant False Alarm Rate Detector for a Pulse Radar in a Maritime Environment", by Cole et al. in *Proceedings of the IEEE 1978 National Aerospace and Electronics Conference NAECON 78*, vol. 3, pp. 1110-1113.
"Radar Signal Processing Technology" by Grimm et al. in *IEEE Electro/78 Conference Record*, 1978, pp. 1-11.

*Primary Examiner*—Thomas H. Tarcza
*Assistant Examiner*—Bernarr Earl Gregory
*Attorney, Agent, or Firm*—Spencer & Frank

[57] ABSTRACT

A method of recognizing targets and suppressing spurious signals in radar equipment, in which the surveillance area is divided, in azimuth and range, into a plurality of radar cells. The method comprises comparing the echo signal of each radar cell with a threshold value, producing a sequence of magnitude related amplitude values of echo signals in certain neighboring cells and deriving the threshold value from a value situated in a specific position in said sequence.

20 Claims, 8 Drawing Figures

| CYCLE NO. | 1 | 2 | 3 | 4 | 5 | 6 | 7 |
|---|---|---|---|---|---|---|---|
| NEW VALUE | 2 | 2 | 2 | 2 | 2 | 8 | 5 |
| REGISTER NO. | 1 2 3 4 | 1 2 3 4 | 1 2 3 4 | 1 2 3 4 | 1 2 3 4 | 1 2 3 4 | 1 2 3 4 |
| REGISTER CONTENTS  OLD | 9 5 2 7 | 2 5 2 7 | 2 2 2 7 | 2 2 2 7 | 2 2 2 2 | 2 2 2 2 | 2 8 2 2 |
| REGISTER CONTENTS  NEW | ②5 2 7 | 2 ② 2 7 | 2 2 ② 7 | 2 2 2 ② | ② 2 2 2 | 2 ⑧ 2 2 | 2 8 ⑤ 2 |
| RANK COUNTER 1.S | 0 0 0 0 | 0 1 1 0 | 1 0 2 0 | 2 1 0 1 | 3 2 1 0 | 0 3 2 1 | 0 2 2 1 |
| RANK COUNTER 2.S | 1 1 1 1 | 1 2 2 1 | 2 1 3 1 | 3 2 1 2 | 0 3 2 1 | 0 0 2 1 | 0 3 3 1 |
| RANK COUNTER 3.S | 0 1 1 1 | 1 0 2 1 | 2 1 0 1 | 3 2 1 0 | 0 3 2 1 | 0 3 2 1 | 0 3 2 1 |

FIG.8

METHOD OF AND A DEVICE FOR RECOGNIZING TARGETS AND SUPPRESSING SPURIOUS SIGNALS IN RADAR EQUIPMENT

BACKGROUND OF THE INVENTION

The invention relates to a method of suppressing spurious signals in radar equipment and a device for carrying out the method.

The surveillance region of radar installations is generally divided, in azimuth and range, into a plurality of radar cells. For each radar cell there is an echo signal which is obtained by scanning the echo received by the aerial. To produce a decision as to whether the echo is a target or a disturbance, methods are used in radar signal processing whereby the average disturbance power is estimated locally and adaptively and whereby a constant and very low false alarm rate (constant-false-alarm-rate, CFAR) can be set as a result. A method frequently used calculates the arithmetic mean value from the amplitude values in the particular environment of the cell under test and derives a decision threshold therefrom. If the amplitude value in the cell under test exceeds this threshold value, the echo is recognised as a target, otherwise it is a disturbance. Behind this method is the implicit assumption that a statistically uniform disturbance process exists in the particular environment.

If echoes from two targets situated close together are present in the radar field, it can happen, when using this method of estimating, that the arithmetic mean value rises greatly in the environment under consideration as a result of the target echoes and both target reports are cut out as a result of the threshold value derived from the environment.

SUMMARY OF THE INVENTION

It is an object of the present invention to provide a method and a device for suppressing spurious signals which take into consideration the distribution of the echo amplitudes in the environment of the particular cell examined.

According to a first aspect of the invention, there is provided a device for recognising targets and suppressing spurious signals in radar equipment, in which the surveillance area is divided, in azimuth and range, into a plurality of radar cells, said device comprising a comparator for comparing the echo signal of each said radar cell with a threshold value, means for forming component regions from radar cells in a predetermined neighbourhood of the radar cell to be compared, a rank arranging device having inputs to which the amplitude values of the component region with the youngest of the amplitude values of all the neighbourhood cells are applied, a store in which the amplitude values of this said component region are deposited and arranged according to magnitude, means for selecting values from one or more specific store locations, a register in which the selected values are stored, a sorting device having first inputs at which the selected values from the store appear and second inputs at which the selected values stored in the register for the others of the plurality of component regions appear, for sorting selected values appearing at all its inputs according to magnitude, a further store for receiving the sorted selected values and a device for reading the amplitude value stored in a predetermined location of said further store for determination of said threshold value. Further according to this aspect of the invention, there is provided a method of recognising targets and suppressing spurious signals in radar equipment with division of the surveillance area, in azimuth and range, into a plurality of radar cells, in which the echo signal of each radar cell is compared with an amplitude threshold value which is derived from the echo signals of the radar cells which lie in a predetermined neighbourhood of the cell under consideration, wherein the amplitude values of the echo signals from the neighbouring cells are stored and arranged in order of magnitude, and wherein value situated at a specific location in this sequence of values is selected for the derivation of the threshold value.

Still further according to this aspect of the invention there is provided a method of recognizing targets and suppressing spurious signals in radar equipment with division of the surveillance area, in azimuth and range, into a plurality of radar cells, in which the echo signals of each radar cell is compared with an amplitude threshold value which is derived from the echo signal of the radar cells which lie in a predetermined radial and/or azimuthal neighbourhood of the cell under consideration, wherein a plurality of component regions are formed from the radar cells in the predetermined neighbourhood, the amplitude values of the radar cells within each component region are each stored and arranged in a rank sequence according to magnitude, one or more values situated at one or more specific locations in the particular rank sequence are selected, the selected values are in turn sorted according to magnitude into a value sequence and a value situated at a fixed location in this value sequence is further used to derive the threshold value.

According to a second aspect of the invention, there is provided a device for recognising targets and suppressing spurious signals in radar equipment in which the surveillance area is divided, in azimuth and range, into a plurality of radar cells, said device comprising comparison means for comparing the echo signal of each said radar cell with a threshold value, rank arranging means for arranging amplitude values of the echo signals in a predetermined neighbourhood of said radar cell to be compared in order of magnitude as a sequence of values, and threshold value deriving means for deriving said threshold value from a value situated in a specific location in said sequence of values.

Further according to this aspect of the invention, there is provided a device for recognising targets and suppressing spurious signals in radar equipment, in which the surveillance area is divided, in azimuth and range, into a plurality of radar cells, said device comprising a comparator for comparing the echo signal of each said radar cell with a threshold value, a rank arranging device for arranging amplitude values of the echo signals of radar cells in a predetermined neighbourhood of the said radar cell to be compared with said threshold value, a one dimensional store for storing said arranged amplitude values and means for reading the amplitude value stored in a specific store location for determining said threshold value.

Still further according to this aspect of the invention, there is provided a device for recognising targets and suppressing spurious signals in radar equipment, in which the surveillance area is divided, in azimuth and range, into a plurality of radar cells, said device comprising a comparator for comparing the echo signal of each said radar cell with a threshold value, means for forming component regions from radar cells in a predetermined neighbourhood of the radar cell to be compared, a separate rank arranging device for each component region, for arranging the amplitude values of the echo signals from the radar cells of the particular component region according to their magnitude and a one dimensional store for receiving said arranged amplitude values and out of which the values selected and stored at one or more specific store locations are made available, a sorting device which sorts out the selected values according to magnitude, a further store for receiving the sorted values, and a reading device for reading the amplitude value stored in a predetermined location of said further store out of this location for use in determining said threshold value.

BRIEF DESCRIPTION OF THE DRAWINGS

The inventions will now be described in greater detail by way of example, with reference to the drawings, in which.

DESCRIPTION OF THE PREFERRED EMBODIMENTS

The method of the invention makes use of so-called ordered statistics. Individual powerful disturbances or targets in the vicinity of the cell examined practically do not have any effect on the estimated value for the disturbance power from which the threshold value for the target decision is derived.

Accordingly only one amplitude value from the environment is used to derive the decision threshold.

The amplitude values from the environment examined are arranged according to magnitude and the value selected for the derivation of the threshold value is taken from a specific location which may advantageously be situated approximately in the middle of the sequence of values. A powerful spurious signal or an adjacent target will then essentially alter only the amplitude values at the end of the sequence (higher amplitude values) while the anticipated value at the location of the selected value and hence the threshold value derived from this value remains largely uninfluenced.

In a disturbed environment with a jump in the course of the disturbance power, such as may occur, for example, at the edge of an extensive meteorological disturbance, CFAR methods of estimation with the formation of arithmetic mean values display a low probability of detecting targets and/or a comparatively high false alarm rate in the transition region from the region with a lower disturbance power to the region with a higher disturbance power.

Echo signals from a target usually appear in a plurality of adjacent radar cells because of the spatial extent of the target and the limited resolution capacity in azimuth and range. In order to avoid the self cutting-out of a target, that is to say the influencing of the threshold value by the target echo itself, it may be an advantage not to include the cells immediately adjacent to the cell under consideration (cell under test) in the environment taken into consideration to determine the threshold value.

In the method described above, all the values of the environment considered of the cell under test are compared with one another. As a result, the device for arranging the values in order of rank is very expensive for relatively large neighbourhoods.

Accordingly, a modified method provides that a plurality of component regions are formed from the radar cells in the predetermined neighbourhood and the echo amplitude values within each component region are arranged separately according to magnitude.

As a result of the formation of a plurality of component regions from the radar cells present in the neighbourhood, the individual component regions remain smaller and can be arranged with little expense. The various component regions are fixed in relation to the particular radar cell under consideration and do not necessarily have to be disjunct. A rank sequence is formed from the amplitude values within each component region. One or more values are selected from the rank sequence for further processing. These values are situated at specific locations in the rank sequence. The values selected from the component regions are again sorted into a value sequence according to magnitude and a value situated at a fixed location in this value sequence is conveyed further for the derivation of the threshold value.

The expenditure can be significantly reduced by this method and at the same time the essential advantages of a target recognition and disturbance suppression of a CFAR method with ordered statistics are retained.

In a favourable manner, the individual component regions are alike in shape and size, measured in radar cells in the direction of azimuth and range. Apart from the uniform treatment of all the component regions, such an embodiment affords particularly advantageous possibilities for the further reduction in expense. A further uniformity in the treatment of the plurality of component regions consists in that the specific locations in the rank sequences where the values selected for further processing are situated are the same in the rank sequences of all the component regions. If all the component regions have the same shape and size, then as a result of displacement of the particular cell under consideration, a precise overlapping of an actual component region with another component region of a cell already considered earlier results. The amplitude values in the component region are still the same so that on a renewed arrangement in rank, the same rank sequence again results. From this, with the same specific locations, the same selected values again result. A particularly advantageous embodiment therefore provides that during the processing of a component region for the first time, that is to say arranging the amplitude values appearing therein in order of rank and selecting one or more values from specific locations in the rank sequence, the selected values should be stored. If the same component region again crops up for processing at a later time for another cell under test, the amplitude values do not need to be subjected again to an arrangement in order of rank because the selected values are already available in store. With N like component regions to a cell under test, an arrangement in order of rank is then only carried out for one component region, namely for the component region with the youngest amplitude value. For the other $N-1$ component regions, it is possible to go back to the selected values deposited in the store. A considerable reduction in expense results from this.

In a preferred embodiment, only one value is selected from each of the rank sequences belonging to the plurality of component regions.

For many cases it has proved favourable to move the maximum value on out of the selected values for the derivation of the threshold value.

In an advantageous embodiment, two component regions which lie symmetrically to the cell under test and which, for example, comprise radar cells which are only adjacent in the range direction, are provided. In another preferred embodiment, a third component region is provided, apart from these two component regions and includes the cell under test as an environmental cell. This third component region may well overlap with the other two component regions.

In a preferred embodiment of the method according to the invention, only the echo signals from radially adjacent cells are used to determine the threshold value. As a result of this measure, only a small expenditure on stores is necessary.

In a favourable manner, the amplitude value selected for the derivation of the threshold value is simply multiplied by a constant factor in order to give the threshold value. For a variation in the required probability of false alarms, this constant factor is advantageously adjustable by the operating staff.

For the optimum utilization of the advantages of the invention, the selected amplitude value preferably lies approximately in the middle of the sequence of the ordered amplitude values. In order to secure an estimated value at boundaries of disturbance regions which is sufficiently high for a low false alarm rate, the position of the selected amplitude value is offset from the middle of the sequence in the direction of higher amplitude values. For the deliberate alterations of the required probability of false alarm or the probability of target detection, the position of the selected amplitude value inside the sequence may advantageously be adjustable.

The method according to the invention for suppressing spurious signals may advantageously be reinforced by a distinction between fixed targets and moving targets or disturbers. For this purpose, it is provided that the echo signals should be subjected to a Doppler filtering before the evaluation according to the invention. In this case, on travelling through a Doppler filter bank, the echoes are allocated to one of a plurality of speed ranges according to the radial speed detected. Thus a simplified echo situation is already present for the evaluation of the echo signals of the radar cell raster allocated to one of these speed ranges. Since a target frequently appears in more than one speed range, a further advantageous embodiment of the method according to the invention provides that echo signals from a plurality of adjacent speed ranges should be arranged and compared.

Figure 1:
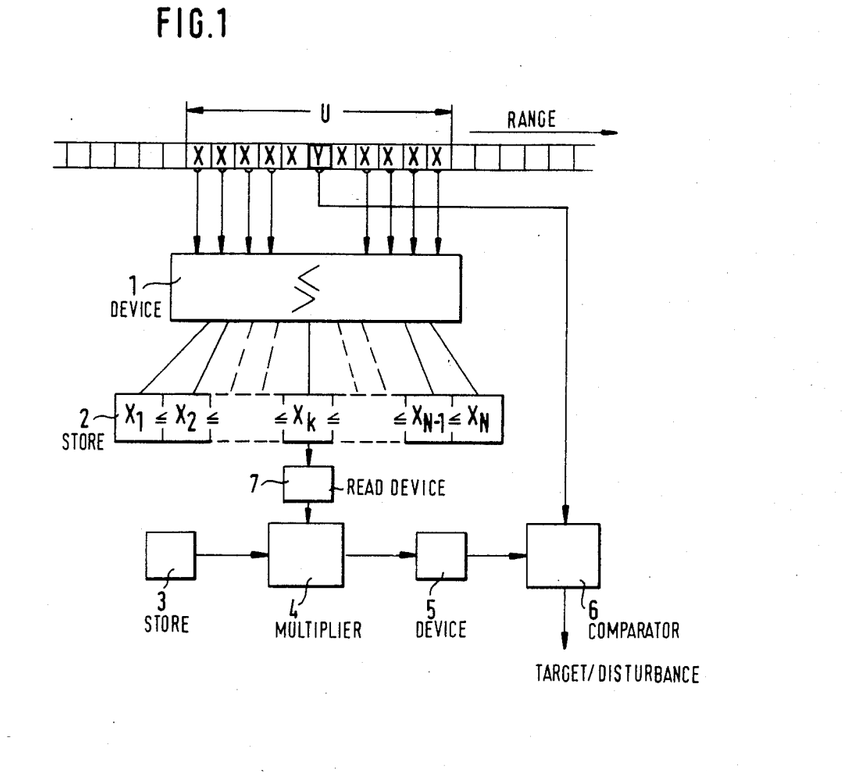
FIG. 1 shows the basic signal course and construction of a device according to the invention.

Referring now to the drawings, in the device sketched in FIG. 1, the echo signals of radar cells following one another in range travel in steady succession through a fixed region window U. The region window fixes the limits for the region of the cell under test. The amplitude value of the cell under test is given by Y, the amplitude values of the radar cells of the region are designated by X. The particular cell under consideration is connected to the threshold value comparator 6. The radar cells immediately adjacent to the cell under consideration are ignored for the determination of the threshold value. The other N values X from the region cells are supplied through tapping points of the device 1 for amplitude comparison and arrangement. The amplitude values arranged according to magnitude are deposited in the store 2 by the device 1. The store is organized in one dimension with store addresses from 1 to N. The stored values increase steadily from $X_1$ to $X_N$, $X_1 \leq X_2 \leq \ldots \leq X_N$. A specific store location, with the address k in the example shown, is connected to the read device 7 which reads the amplitude value $X_k$ stored there to determine the threshold value. The derivation of the threshold value from the amplitude value $X_k$ read is effected via a multiplier 4 which multiplies the value read out by a constant factor deposited in the store 3. The output of the multiplier 4 is connected to a device 5 for preparing the threshold value which gives the threshold value for the target decision to the threshold-value comparator 6.

In the simplest case, the device 5 may be omitted and the output of the multiplier 4 may be connected directly to the comparator 6. If the amplitude value Y exceeds the threshold value, a TARGET is recognized, otherwise it is a DISTURBANCE. As the echo signals travel through the region window U, the values in the store 2 are re-arranged each time and so a new threshold value is fixed.

Figure 2:
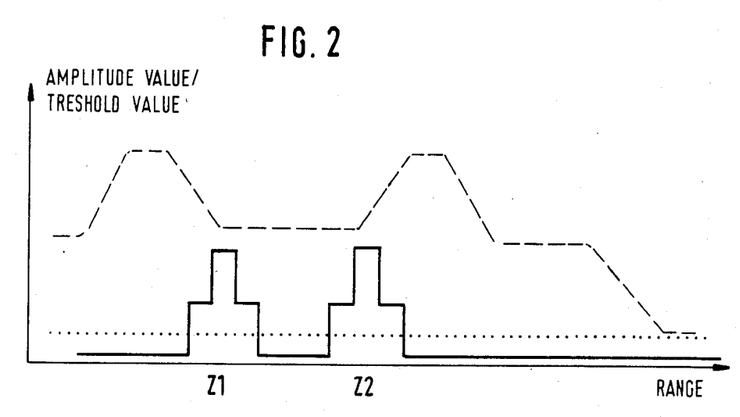
FIG. 2 shows graphically, the course of amplitude and threshold values for the case of two closely adjacent targets.

For the case of two closely adjacent targets (Z1, Z2), FIG. 2 shows a comparison of the course of the threshold values over the range with the formation of arithmetic mean values (broken line) on the one hand and the method according to the invention (dotted line) on the other hand. Whereas the targets are mutually cut out by sharp rising of the threshold value derived from the arithmetic mean value, the threshold value remains practically uninfluenced with the method according to the invention and both targets are recorded separately.

Figure 3:
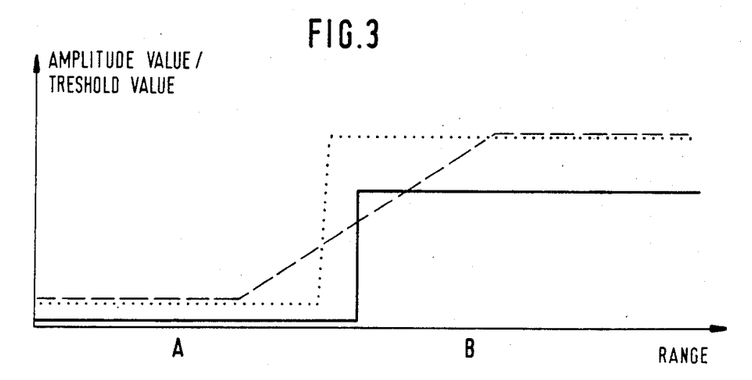
FIG. 3 shows graphically, the course of amplitude and threshold values for the case of the boundary of a disturbance region.

FIG. 3 shows the corresponding comparison for the situation at the boundary of a disturbance region with a region of low disturbance level (A) and a region of high disturbance level (B) beginning abruptly. The threshold value derived from the formation of an arithmetic means value gives rise to losses in target detection in the region of the transition and an increased false alarm rate, while the course of the threshold value follows the stepped course of the disturbance very well with the evaluation according to the invention. In order to avoid false alarms at the region boundaries, the location of the selected amplitude value is offset from the precise centre ($k=N/2$) of the ordered sequence in the direction of higher amplitude values ($k>N/2$). For $k=N/2$ the step in the course of the threshold value would coincide with the set in the course of the amplitude.

Figure 4:
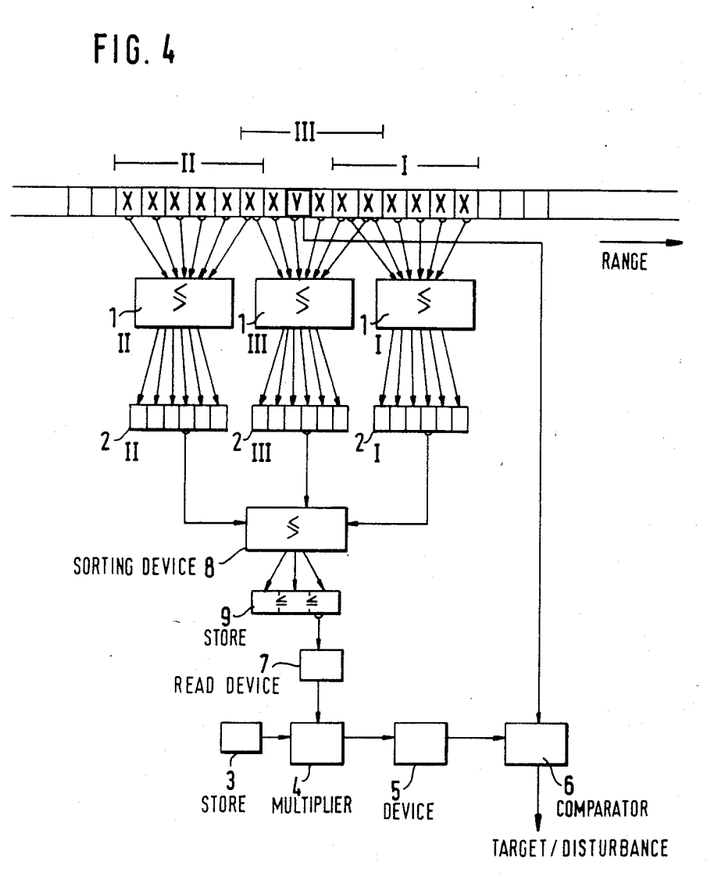
FIG. 4 shows the basic signal course and construction of a further device according to the invention.

In the device shown in FIG. 4, only radar cells relating to one radar period are considered for the sake of clarity. These are situated one behind the other in the range direction. During the processing of the radar signals, the particular cell Y under consideration, the cell under test, passes through the successive radar cells. The component regions I, II and III, which are fixed with regard to the cell Y under consideration, are displaced in synchronism therewith. The component regions are equally large and, in the example illustrated, each comprise six radar cells. In a real case, the number of radar cells per component region is generally greater. The component regions partially overlap. The amplitude values for a component region I, II or III are each supplied to a respective rank arranging device $1_I$, $1_{II}$ or $1_{III}$. The amplitude values of each component region are arranged according to magnitude in the rank arranging devices 1 and are deposited as rank sequences in respective stores $2_I$, $2_{II}$ and $2_{III}$.

In the stores 2, a specific store location in each case, the third in the case of this example, is provided with a connection leading on. Thus, out of the three rank sequences, the value appearing at the third place is selected in each case. The selected values $W_I$, $W_{II}$ and $W_{III}$ are supplied to a sorting device 8 which, like the devices 1, sorts out the amplitude values appearing at its inputs according to magnitude and stores them as a sorted sequence of values in a store 9. The value of a fixed location in this sequence of values is read by a read device 7 and supplied to a multiplier 4 for further processing. This multiplies the value read by a factor F deposited in a store 3. The output of the multiplier 4 is connected to a device 5 for preparing the threshold value which gives the threshold value for the target decision to the threshold value comparator 6.

Figure 5:
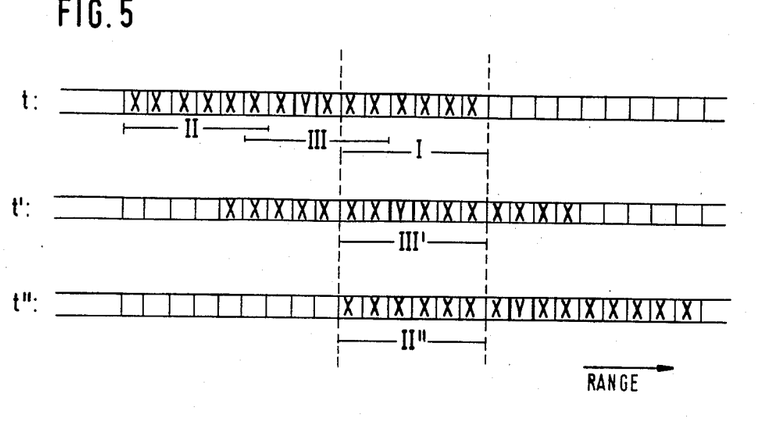
FIG. 5 shows the position of the cell under test with three component regions at three different moments.

FIG. 5 shows how the cell under test Y, with the component regions I, II and II fixed in relation to it, is displaced in the direction of radar cells corresponding to the increasing range. The radar cells which form the component region I for the cell Y at the moment t, form the component region III' for the cell Y' at a later moment t', and the component region II' for the cell Y'' at an even later moment t''. The same amplitude-value rank sequence, and hence also the same selected value W results, for the component regions III' and II' as for the component region I at an earlier moment.

Figure 6:
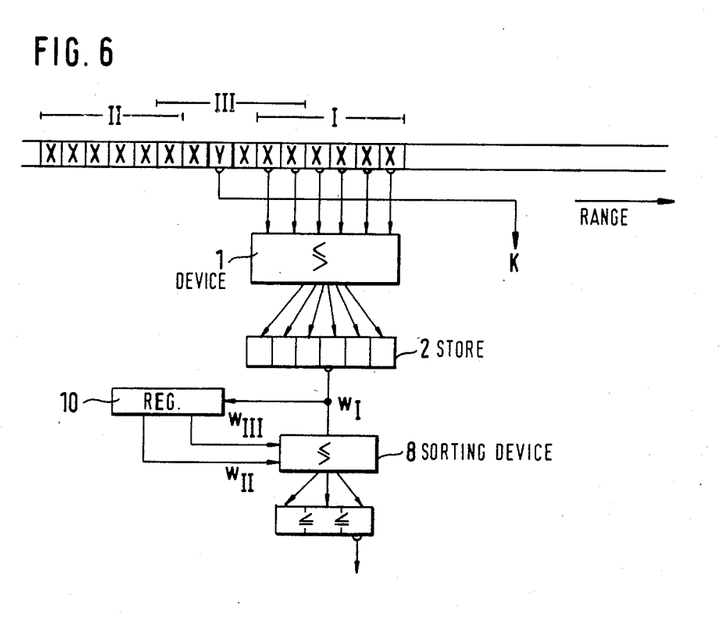
FIG. 6 shows a particularly advantageous device for carrying out one form of execution of the method according to the invention.

Recognition of this fact leads to a device as sketched in FIG. 6. This device performs precisely the same as the device illustrated in FIG. 4 but is considerably simpler in construction in comparison with same. The component region I contains the youngest i.e., most recent amplitude value of all the neighbourhood cells covered by the component regions, so that, for this component region, there is not yet any rank arrangement from an earlier moment. Therefore, for the component region I, the amplitude values are arranged according to magnitude in a rank arranging device 1 and the rank sequence thus formed is stored in the store 2.

The value $W_I$ is selected from a specific location in this rank sequence. This selected value $W_I$ is given on the one hand to the first of a plurality of inputs of a sorting device 8 and on the other hand to the input of the register 10. The values selected from the various component regions I at earlier moments are already present in the register 10. The register acts as a delay line for the values fed in and is preferably constructed in the form of a time-controlled shift register. The register 10 has two outputs at which the selected value $W_{III}$ for the component region III and the selected value $W_{II}$ for the component region II are taken off. The two outputs are delayed by t'-t and t''-t respectively in relation to the input of the register (FIG. 5). The selected values $W_{II}$ and $W_{III}$ are applied to further inputs of the sorting device 8. The processing of the values and the corresponding device are the same, for the further processing, as in the device illustrated in FIG. 4.

During the step-by-step advance of the cell under consideration and the region or component regions also displaced over the chain of successive amplitude values, a new group of values to be arranged results in each case, in which the oldest value of the previous group is replaced by a new value. The new value must be arranged at the correct place in the new group of values.

The rank arrangement of a stored group of amplitude values according to magnitude is effected in a cycle, comprising a plurality of steps, so that, in successive cycles, the oldest value of the value group is replaced by a new value in each case, a rank is allocated to each value in the group, and each cycle is divided into at least three steps. In each cycle, in the first step, the oldest value is compared with all the other values and the rank of the values which are greater than this oldest value is decreased by one rank step, in the second step, the oldest value is replaced by the new value, all the other values are compared with the new value and the rank of all the values which are equal to or greater than the new value, is increased by one rank step, and in the third step, the number of values which are smaller than the new value is determined and the rank of the new value is fixed at the number thus determined.

In an advantageous device for arranging the values of a group according to their magnitude, one of a plurality of like assemblies is provided for each value of the group. The assemblies are connected to one another and to the data outputs and inputs of the rank arranging device by a data bus (BUS).

Replacing the oldest value in each case by a new value in each cycle means that the assemblies take it in turns in successive cycles, to replace their store value on the FIFO principle (First In-First Out). This cyclic rotation among all the assemblies is advantageous through the simple control of the assemblies in succession. Within a cycle, one assembly at a time is subject to a separate control for the fresh storage and the fresh determination of a rank value, while all the other assemblies are acted upon simultaneously by the same control signals. The individual method steps and the connection of the assemblies to one another are coordinated by a control device. On the one hand, cycle timing is supplied to this which causes the stepping on to the next assembly for the separate control and the initiation of a fresh sorting cycle. A separate control is understood to mean control instructions or signals which only relate to this one assembly. On the other hand a subsidiary timing to control the correct sequence in time of the method steps within a cycle is supplied to the control device. The production of timing pulses with correct allocation in time is familiar to one skilled in the art. Both timings may advantageously be derived from a common basic timing.

In order to be able to carry out real-time processing of the signals, the complete sorting of a group and possibly a read out of the result of the sorting must be effected within the generally very short period of time which lies between the arrival of two successive values in the chain.

The three method steps of the rank arranging method described above can be carried out simultaneously for all the values in the group of values. The time needed for the sorting is therefore independent of the number of values to be sorted. With the usual processing of the data in parallel form, the sorting method according to the invention can therefore also keep step with very high data renewal rates such as occur in radar signal processing.

Figure 7:
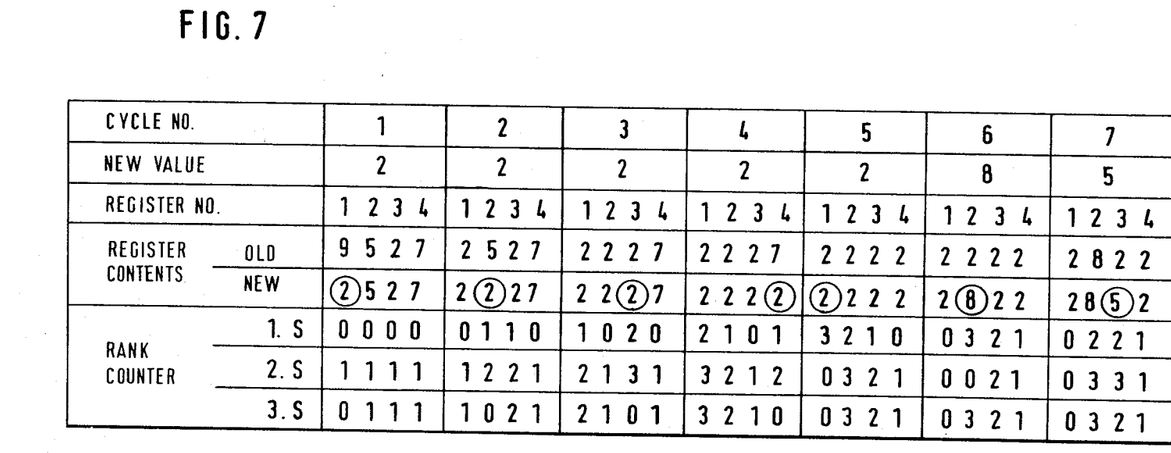
FIG. 7 shows an example of the rank arrangement of a group of four amplitude values in successive cycles.

The demonstration example in the table of FIG. 7 is limited to groups of values with four values for reasons of clarity. The values present at the initiation of the first cycle are selected arbitrarily. Only after the 4th cycle do pure values from the value chain stand in the four registers. The rank arrangement of the register values is therefore likewise only of importance after the 4th cycle. The freshly stored values in each case are emphasized in the row "Register contents-new". The rank counters have a counting range from 0 to 3 in the case of the example and in the position 3, in the event of a further counting step, go back to the counting position 0, and correspondingly from 0 to 3 when counting backwards. This construction of the counters as counting rings is not obligatory but offers with the delivery of a carry signal, an advantageous possibility for controlling the read-out operation provided in a 4th method step. The sorting is terminated with the 3rd method step (3.S) within a cycle. The rank counter positions given in the last row (3.S) therefore represent the correct rank sequence of the values given in the row "Register contents-new" for the particular cycle, after the 4th cycle. During the 1st method step (1.S) and during the 2nd method step (2.S), like rank counter positions may appear for different registers but this does not matter. In addition, the rank counter for the register in which a new value is written, can be ignored for the rank sequence in the first two method steps, because its counting value is fixed in the 3rd method step regardless of the previous counter state. The rank counter position at the beginning of the 1st cycle is optional. In this example, all the counters are set to 0 at the beginning. Since problems are most likely to be expected during the sorting if equal values, hereinafter called equal values, are present within one group of values, the value 2 is given as a new value in each case in the cycles 1–5 in this example.

It will be recognized that, even after including equal values in the sorting, a defined rank sequence is produced. The rank among the equal values increases with increasing age of the value, so that the equal value replaced by a fresh value had the highest rank among the equal values, while a new equal value is sorted into the lowest rank position of the equal values.

In this case, obvious equivalents of the method described are conceivable in which, for example, the oldest equal value may have the lowest rank among the equal values and a fresh equal value may be sorted into the highest rank position of the equal values. Such variants are possible by simple modification of the allocation of the comparison decisions (smaller/larger/equal) for the counting settings (decrease, increase, sum up) from the device described. In a further 4th method step, the value at a specific location in the particular rank sequence, for example the highest value to which the rank counter position 3 is allocated, can be read for further processing. Particularly when the specific location in the rank sequence from which a value is selected, is to be variable, it is a particular advantage if a basic value G is added to the number of the values which are smaller than the value freshly stored, in the 3rd method step, and the rank of the new value is fixed at this sum.

The basic value is set so that, including the predetermined rank number, the value causing maximum counter position is always read out. This simplifies the construction as regards circuitry for finding the selected value. For example, if the register of the rank counter with the counter position 3 is always to be read out, then in the selection of the value standing at the first place in the rank sequence results in the basic value $G=1$ etc. The rank counter position then no longer coincides with the position inside the rank sequence, particularly with ring counters as rank counters.

Figure 8:
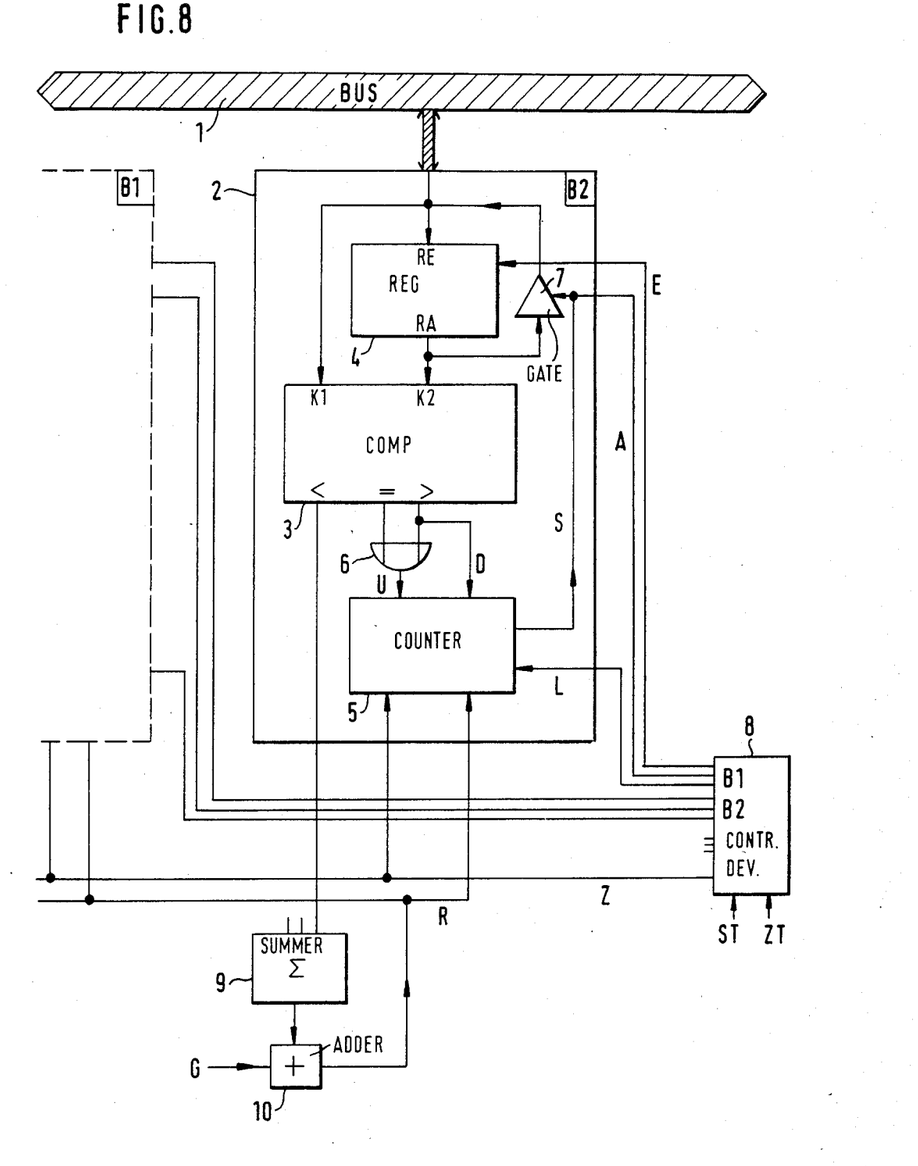
FIG. 8 shows an example of the construction of a rank arranging device.

The device in FIG. 8 shows an assembly 2. This may have the location numeral B1 among the plurality of assemblies. The next assembly with the location numeral B2 is indicated. The assemblies 2 are connected to one another and to the input and output connections of the sorting device through a bidirectional parallel data bus 1 (BUS). The data bus is always directly connected to the input RE of the store register 4 and one of two inputs of the comparator 3. The data appearing at the input RE of the register 4 can be written in the register by a timing pulse on the line E and are then available at the output RA of the register. Thus completely different values may be present at the input RE and output RA of the register. When a value is written in the register a value previously stored is simply overwritten. The output of the register is connected directly to one input K2 of the comparator 3. The comparator compares the register contents with the value present on the data bus and appearing at its second input K1 and accordingly delivers a signal at one of three outputs <(K1 smaller than K2), =(K1 equal to K2) or >(K1 larger than K2). The >signal passes directly over the line D as a backward counting signal to the rank counter 5.

The = signal and the > signal of the comparator each deliver a forward counting signal for the rank counter through an OR element 6. The mode of counting (forwards or backwards) which determines whether one of the signals from the comparator actuates the counter, a set by the control device 8 via the line Z common to all the assemblies. In the 1st method step, for example, the mode backward counting (decreasing) is set, in the 2nd method step the mode forward counting (increasing) is set.

The < outputs of all the comparators are connected directly to the summer 9. The number of the register values detected in this summer, which are smaller than the value present on the data bus, may also have a basic value G added to it in an adder 10. The sum value at the output of the adder 10 appears at the inputs of all the rank counters 5 via the common line R. The transfer (loading) into the rank counter is activated via the line L connected with the control device 8 but only in the assembly in the register of which a fresh value was stored in the same cycle. Through a signal on the line S from the rank counter 5, a gate 7 is controlled through which the contents of the register 4 are read out onto the data bus 1. In the 4th method step, only that rank counter which has a specific counter position, for example the highest counting stage, after the 3rd method step, delivers a signal over its line S.

The interrogation of the rank counters can be effected, for example, via the control line Z. The use of counters which go back to the smallest counting stage (zero) on exceeding their highest counting stage and in doing so deliver a carry signal, is particularly advantageous. This carry signal can serve as a read-out signal on the line S.

The read-out of the oldest register value in the 1st method step is effected by a signal on the line A from the control device 8 to the gate 7 of the assembly. The oldest value is stored in the register in which the new value is written. The stored value should be retained during the read-out and is only overwritten during the writing of a new value by a timing pulse on the line E.

Leading to each assembly from the control device are signal lines E, A and L which transmit signals only for this one assembly during a cycle. During the next cycle another separate group of lines carries the same signals to the next assembly. The common lines R and Z and the data bus 1 are connected to all the assemblies during each cycle. The control signals on the line Z control all the rank counters in the same manner. The control device therefore switches on from one group of lines E, A, L to the next from cycle to cycle. For this purpose, the control device 8 preferably contains a location counter with the addresses of the plurality of assemblies. This location counter is switched on one place by each pulse of the cycle timing ZT. The cycle timing is generally equal to the data timing of the incoming values. The individual method steps within a cycle timing are controlled by the control device according to a sub-timing ST, one cycle timing step comprising at least four subtiming steps.

Also advantageous is the use of register-comparators which unite the store register and comparator of an assembly in one electrical component.

It will be understood that the above description of the present invention is susceptible to various modifications, changes and adaptations.

What is claimed is:

1. In a method of recognizing targets and suppressing spurious signals in radar equipment with division of the surveillance area, in azimuth and range, into a plurality of radar cells, the improvement wherein: the echo signal of each radar cell is compared with an amplitude threshold value which is derived from the echo signals of the radar cells which lie in a predetermined neighbourhood of the cell under consideration, the amplitude values of the echo signals from the neighbouring cells are stored and arranged in order of magnitude, and a value situated at a specific location in this sequence of values is selected for the derivation of the threshold value.

2. A method as defined in claim 1, wherein the amplitude values of the echo signals of the cells immediately adjacent the cell under consideration are not stored and arranged, and hence are not taken into account in determining the threshold value.

3. A method as defined in claim 1, wherein only echo signals from radially adjacent cells are arranged and compared.

4. A method as claimed in claim 1, wherein the rank arrangement of a stroed group of amplitude values according to magnitude is effected in a cycle comprising a plurality of steps wherein, in successive cycles, the oldest value of the value group is replaced by a new value in each case, a rank is allocated to each value in the group, and each cycle is divided into at least three steps, and wherein first in the step, the oldest value is compared with all the other value and the rank of the values which are greater than this oldest value is decreased by one rank step, in the second step, the oldest value is replaced by the new value, all the other values are compared with the new value and the rank of all the values which are equal to or greater than the new value, is increased by one rank step, and in the third step, the number of values which are smaller than the new value is determined and the rank of the new value is fixed at the number thus determined.

5. A method as defined in claim 4, and comprising a fourth step within each cycle, during which the value of the value group having a predetermined rank is determined and given out.

6. A method of recognizing targets and suppressing spurious signals in radar equipment with division of the surveillance area, in azimuth and range, into a plurality of radar cells, in which the echo signal of each radar cell is compared with an amplitude threshold value which is derived from the echo signals of the radar cells which lie in a predetermined radial or azimuthal neighbourhood of the cell under consideration, wherein a plurality of component regions are formed from the radar cells in the predetermined neighbourhood, the amplitude values of the radar cells within each component region are each stored and arranged in a rank sequence according to magnitude, at least one value situated at respective specific locations in the particular rank sequences are selected, the selected values are in turn sorted according to magnitude into a value sequence, and a value situated at a fixed location in this value sequence is further used to derive the threshold value.

7. A method as defined in claim 6, wherein three component regions are formed, with two of said regions lying substantially symmetric to the particular cell under consideration and the third region including the cell under consideration and partially overlapping the other two component regions.

8. A method as defined in claim 6, wherein the component regions extend, in azimuth and range, over the same number of radar cells, the specific locations of the value sequence are the same in the individual component regions, during the first processing of a component region, the selected value or values are stored and during each further processing of the same component region only these stored values are read out and further processed.

9. A method as defined in claim 6 wherein only one value is selected from said rank sequence of each component region.

10. A method as defined in claim 6, wherein of the values selected, the maximum is said value further used to derive the threshold value.

11. A device for recognising targets and suppressing spurious signals in radar equipment in which the surveillance area is divided, in azimuth and range, into a plurality of radar cells, said device comprising a comparator for comparing the echo signal of each said radar cell with a threshold value, a rank arranging device for arranging amplitude values of the echo signals of radar cells in a predetermined neighbourhood of the said radar cell to be compared with said threshold value, a one dimensional store for storing said arranged amplitude values, and means for reading the amplitude value stored in a specific store location for determining said threshold value.

12. A device as defined in claim 11, wherein said specific store location lies substantially in the middle of said store.

13. A device as defined in claim 11, wherein said rank arranging device comprises a sub-assembly, for each value of the value group, having a read-write store register, a comparator having a first input connected to the output of said read-write store register and a rank counter counting forwards and backwards, and a data bus common to all the sub-assemblies to which a second input of said comparator and the input of the register are connected, means for reading out the register contents to the data bus, a summer for adding up the number of values which are smaller than a newly stored value, and a control device for controlling individual method steps of the operation of said device according to a predetermined subtiming and for starting a fresh cycle according to a cycle timing.

14. A device for recognising targets and suppressing spurious signals in radar equipment, in which the surveillance area is divided, in azimuth and range, into a plurality of radar cells, said device comprising a comparator for comparing the echo signal of each said radar cell with a threshold value, means for forming component regions from radar cells in a predetermined neighbourhood of the radar cell to be compared, a separate rank arranging device for each component region, for arranging the amplitude values of the echo signals from the radar cells of the particular component region according to their magnitude, a plurality of separate one dimensional stores for each receiving said arranged amplitude values from a respective said rank arranging device and out of which selected values stored at specific store locations are made available, a sorting device which sorts out the selected values according to magnitude, a further store for receiving the sorted values, and a reading device for reading the amplitude value stored in a predetermined location of said further store out of this location for use in determining said threshold value.

15. A device as defined in claim 14, wherein said specific store locations lie substantially in the middle of each respective said store.

16. A device as claimed in claim 14, wherein said rank arranging device comprises a sub-assembly, for each value of the value group, having a read-write store register, a comparator having a first input connected to the output of said read-write store register and a rank counter counting forwards and backwards, and a data bus common to all the sub-assemblies to which a second input of said comparator and the input of the register are connected, means for reading out the register contents to the data bus, a summer for adding up the number of values which are smaller than a newly stored value, and a control device for controlling individual method steps of the operation of said device according to a predetermined subtiming and for starting a fresh cycle according to a cycle timing.

17. A device for recognising targets and suppressing spurious signals in radar equipment, in which the surveillance area is divided, in azimuth and range, into a plurality of radar cells, said device comprising a comparator for comparing the echo signal of each said radar cell with a threshold value, means for forming component regions from radar cells in a predetermined neighbourhood of the radar cell to be compared, a rank arranging device, having inputs to which the amplitude values of the component region with the most recent of the amplitude values of all the neighbourhood cells are applied, for arranging the amplitude values of the echo signals of the cells of this said component region according to magnitude, a store for storing the arranged amplitude values, means for selecting a value from at least one specific store location, a register in which the selected values are stored, a sorting device, having first inputs at which the selected values from the store appear and second inputs at which the selected values stored in the register for the others of the plurality of component regions appear, for sorting selected values appearing at all its inputs according to magnitude, a further store for receiving the sorted selected values, and a device for reading the amplitude value stored in a predetermined location of said further store for determination of said threshold value.

18. a device as defined in claim 17 wherein said component regions each extend, in azimuth and range, over the same number of radar cells.

19. A method of recognising targets and suppressing spurious signals in radar equipment in which the surveillance area is divided, in azimuth and range, into a plurality of radar cells, said method comprising comparing the echo signal of each radar cell with a threshold value, arranging amplitude values of the echo signals of cells in a predetermined neighbourhood of the cell to be compared in order of magnitude as a sequence of value, and deriving said threshold value from a value situated in a specific location in said sequence of values.

20. A device for recognising targets and suppressing spurious signals in radar equipment in which the surveillance area is divided, in azimuth and range, into a plurality of radar cells, said device comprising comparison means for comparing the echo signal of each said radar cell with a threshold value, rank arranging means for arranging amplitude values of the echo signals in a predetermined neighbourhood of said radar cell to be compared in order of magnitude as a sequence of values, and threshold value deriving means for deriving said threshold value from a value situated in a specific location in said sequence of values.

* * * * *